US008250598B2

(12) United States Patent
Velazquez et al.

(10) Patent No.: US 8,250,598 B2
(45) Date of Patent: Aug. 21, 2012

(54) METHOD AND APPARATUS FOR TRANSMITTING EMERGENCY ALERT MESSAGES

(75) Inventors: Leonardo Velazquez, Plano, IL (US); James L. Ford, III, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 491 days.

(21) Appl. No.: 12/577,791

(22) Filed: Oct. 13, 2009

(65) Prior Publication Data

US 2011/0088058 A1     Apr. 14, 2011

(51) Int. Cl.
*H04N 7/10* (2006.01)
*H04N 7/025* (2006.01)

(52) U.S. Cl. ............... 725/33; 725/32; 725/35; 725/105; 455/404.1; 455/521

(58) Field of Classification Search ...................... 725/33
See application file for complete search history.

(56) References Cited

U.S. PATENT DOCUMENTS

| 7,130,389 | B1* | 10/2006 | Rodkey et al. | 379/88.12 |
| 2007/0047520 | A1* | 3/2007 | Byers et al. | 370/352 |
| 2007/0121800 | A1* | 5/2007 | Rodkey et al. | 379/37 |
| 2007/0207771 | A1* | 9/2007 | Bowser et al. | 455/404.1 |
| 2010/0003945 | A1* | 1/2010 | Primo et al. | 455/404.1 |

FOREIGN PATENT DOCUMENTS

| JP | 09162758 A | * | 6/1997 |
| JP | 2002-150457 | * | 5/2002 |
| JP | 2008-294901 A | * | 12/2008 |

* cited by examiner

*Primary Examiner* — Kristine Kincaid
*Assistant Examiner* — Robert Hance
(74) *Attorney, Agent, or Firm* — Guntin Meles & Gust, PLC; Andrew Gust

(57) ABSTRACT

A method and apparatus for transmitting emergency messages is disclosed. A system that incorporates teachings of the present disclosure may include, for example, a set top box in communication with an interactive television network where the set top box has a controller to receive a notification signal from a network server of the interactive television network where the notification signal is associated with an emergency alert message received by the network server from an emergency alert system, determine a language for presenting the emergency alert message, select a first multicast of the emergency alert message from a group of multicasts based on the determined language where each of the group of multicasts of the emergency alert message being in a different language, transmit a request to the network server to join the first multicast of the emergency alert message, and receive the first multicast of the emergency alert message. Additional embodiments are disclosed.

19 Claims, 5 Drawing Sheets

METHOD AND APPARATUS FOR TRANSMITTING EMERGENCY ALERT MESSAGES

FIELD OF THE DISCLOSURE

The present disclosure relates generally to communication systems, and more specifically to a method and apparatus for transmitting emergency alert messages.

BACKGROUND

Generally, an emergency alert system (EAS) transmits alert messages such as severe weather warnings by way of radio and TV stations. Receipt of these messages can provide valuable information to individuals who need to take precautions based on the information contained therein. Often, there is a limited amount of time between receipt of the EAS message and the occurrence of the particular conditions that are the subject of the EAS message.

DETAILED DESCRIPTION

Figure 1:
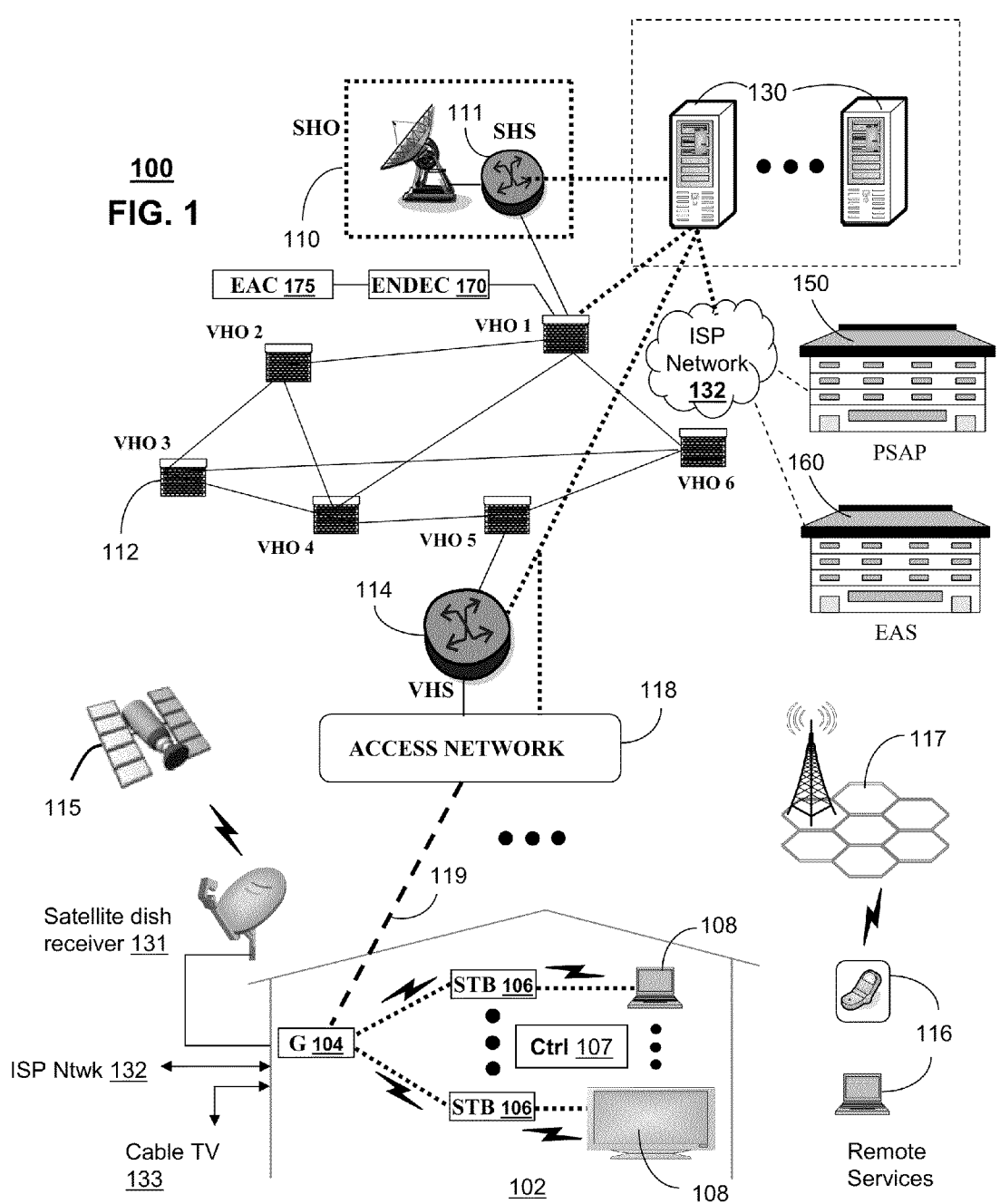
FIGS. 1-3 depict exemplary embodiments of a communication system.

Embodiments in accordance with the present disclosure provide a method and apparatus for transmitting emergency messages.

In one embodiment of the present disclosure, a computer-readable storage medium operating in an Internet Protocol Television (IPTV) network is described. The medium can have computer instructions for receiving an emergency alert notification from an emergency alert system by way of an OSS/BSS gateway where the emergency alert notification is associated with an emergency alert message of the emergency alert system, transmitting an overlay notification signal to a set top box coupled to the IPTV network, receiving a request from the set top box in response to the overlay notification signal to join a first multicast of the emergency alert message selected from a group of multicasts of the emergency alert message where each of the group of multicasts is in a different language and where the first multicast is selected based on a pre-selection of a language associated with the set top box, and multicasting the emergency alert message in the different languages, where the set top box is adapted to receive the first multicast of the emergency alert message in the pre-selected language.

In another embodiment of the present disclosure, a set top box in communication with an interactive television network is described. The set top box can include a controller to receive a notification signal from a network server of the interactive television network where the notification signal is associated with an emergency alert message received by the network server from an emergency alert system, determine a language for presenting the emergency alert message, select a first multicast of the emergency alert message from a group of multicasts based on the determined language where each of the group of multicasts of the emergency alert message is in a different language, transmit a request to the network server to join the first multicast of the emergency alert message, and receive the first multicast of the emergency alert message.

In another embodiment of the present disclosure, a method of communicating an emergency alert message of a public emergency alert system can involve receiving a notification signal from a network server of an interactive television network where the notification signal is associated with the emergency alert message received by the network server from the public emergency alert system, determining a language for presenting the emergency alert message, receiving at least one of a first and second multicast of the emergency alert message, and presenting the emergency alert message in the determined language, where the presented emergency alert message is obtained by the set top box based on at least one of: selecting the first multicast of the emergency alert message from a group of multicasts based on the determined language where each of the group of multicasts of the emergency alert message are in a different language; and translating the second multicast into the determined language.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provides broadband services to buildings 102, such as over hardwire links 119, although other links can be used including wireless communication. The hardwire links can be of different types, including optical links and copper twisted pairs such as category 5 cables, 10Base-T, 100Base-TX, 1000Base-T and so forth. System 100 can also utilize an Optical Network Unit (ONU) for delivering data via fiber optics and converting the optical signal to electrical signals for transmission over copper twisted pairs and vice versa. The gateway 104 can be of various types and can include multi-functionality, including one or more of a DSL modem or cable modem, a network switch, LAN switching, a consumer-grade router, and a wireless access point. Various sources of power can be used throughout the network to energize various components including Power-over-Ethernet (PoE) techniques.

The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control). The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services. The exemplary embodiment is described with respect to an IPTV system. However, the present disclosure can be used to provide infrastructure to various types of systems including Ethernet-based business and other residential services, such as Internet access as well as Layer-2 VPN.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as WiFi, or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services. It follows from the above illustrations that the present disclosure can apply to any present or future interactive media content services.

System 100 can include and/or can be operably coupled with a Public Service Access Point (PSAP) 150 and/or an Emergency Alert Service (EAS) 160, including by traditional means, such as a central office, media gateway and/or network 132. The PSAP 150 and/or the EAS 160 can generate emergency broadcast and response services, such as an Emergency Alert Message (e.g., tornado or thunderstorm warning). In one embodiment, the messages can be multi-lingual.

In another embodiment, the EAS alerts can be distributed through a relay chain of radio and TV sources. Each member of the chain can be either an origination point (e.g., National Weather Service for weather alerts) and/or a relay point. The alert information can be distributed in a standard message format that is encoded as an analog audio signal, which reduces the complexity of relaying this information to the STB. System 100 provides for receiving emergency alert notifications from the local news service providers (e.g., LP1, LP2, NWS or approved Emergency Management personnel).

Figure 2:
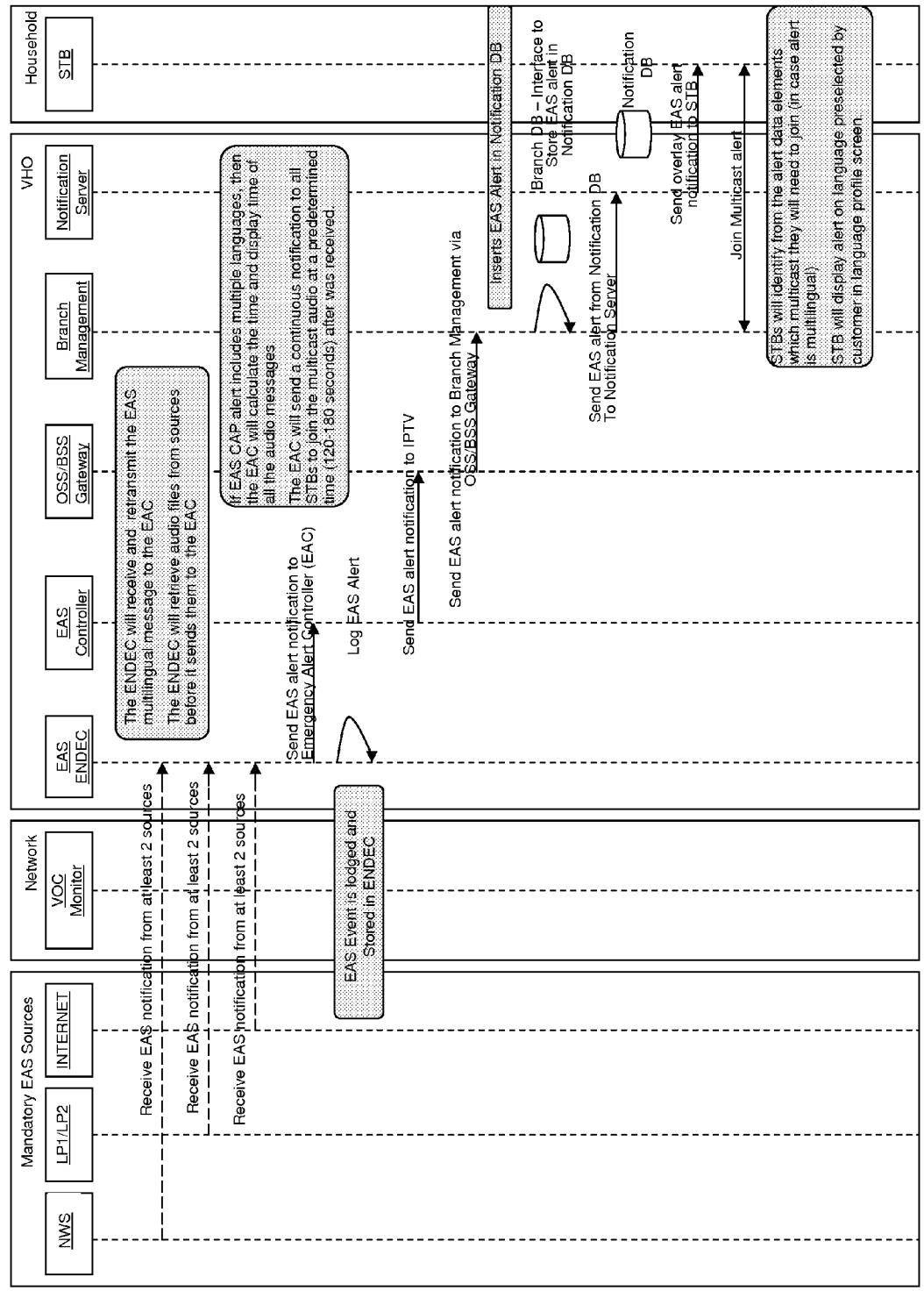

Referring additionally to FIG. 2, when alerts are being received in the VHO 112, an EAS decoder (ENDEC) 170 can be utilized for charging or monitoring the alerts. The ENDEC can relay the EAS alert message to an EAS Controller (EAC) 175. The EAC 175 can then identify if the EAS alert contains audio, and how many languages are included in the alert. In one embodiment, the EAC 175 can multicast the alert to an IPTV Branch Management via an IPTV OSS/BSS Gateway. An emergency alert can then be generated in an IPTV Branch Management Database for distribution to the user's STB 106, such as an overlay message.

In one embodiment, the ability to display an alert message in a different language can depend on the languages supported by the set top box. System 100 can allow users to go to the client language configuration screen and select a preferred language, giving users control over the type of alerts that they want displayed in their set top boxes. In another embodiment, logic can be built into the multilingual display such as where all messages are displayed in English, unless the alert message includes additional languages and the set top box default language has been changed to that language. In another embodiment, if the alert message is only received in English and the set top box configuration is set to another language, the message will not be ignored and will be displayed in English.

As an example, a user can change the language configuration (e.g., default language) in their set top box to Spanish. Then, if the alert comes in both English and Spanish, the message can be displayed only in Spanish on that set top box. However, if the client has the default language as Spanish, and the message alert only includes the alert in English, then the Spanish message will be ignored and the default original message in English will be displayed.

Figure 3:
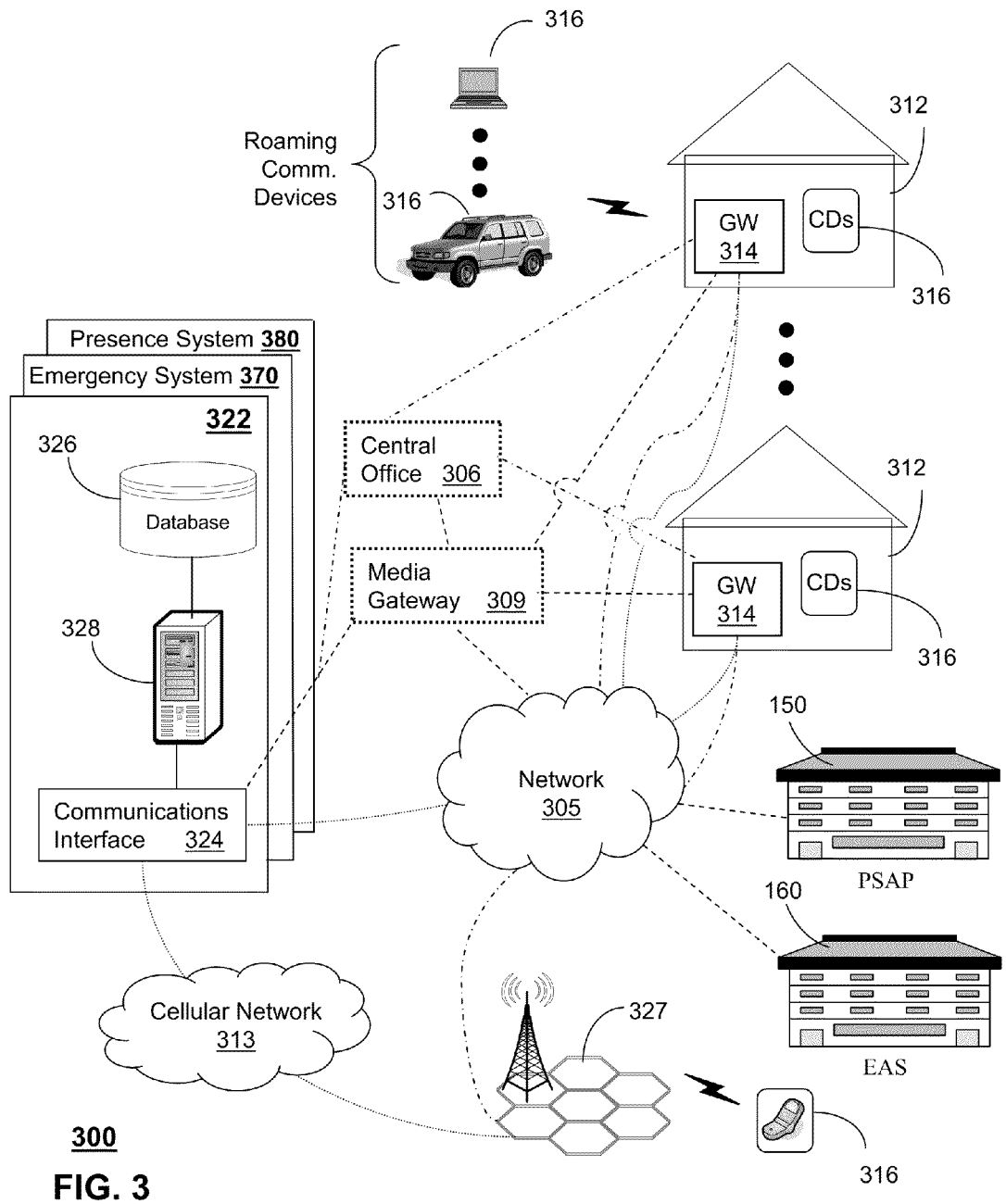

FIG. 3 depicts an exemplary embodiment of communication devices 316 (e.g., set top boxes operably coupled to television sets for displaying media content) communicating by way of wired and/or wireless access points (WAPs) with other communication devices and/or a network proxy 322 which collectively operate in a communication system 300. System 300 can be operably coupled to and/or overlayed with systems 100 and/or 200.

The communication system 300 can comprise a packet-switched network 305. The packet-switched network can be an Internet Service Provider (ISP) network 305. The network 305 can be coupled to the network proxy 322, a cellular network 313 and network devices or elements, including network devices located in one or more of the buildings 312 representing an enterprise or residence. The ISP network 305 utilizes technology for transporting Internet traffic.

In an enterprise setting, the building 312 can include a gateway 314 that provides voice and/or video connectivity services between communication devices 316, such as set top boxes, VoIP terminals or other forms of communication devices of enterprise personnel. In a residential setting, the building 312 can include a gateway 314 represented by, for example, a residential gateway coupled to central office 306 utilizing conventional telephonic switching for processing calls with third parties.

The network proxy 322 can be used to control operations of a media gateway 309, the central office 306, and/or the gateway 314. Communications between the network proxy 322, the communication devices 316 and other network devices of the communication system 300 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 322 can comprise a communications interface 324 that utilizes common technology for communicating over an IP interface with the network 305, the central office 306, the media gateway 309, the cellular network 313, and/or the gateway 314. By way of the communications interface 324, the network proxy 322 can direct by common means any of the foregoing network devices to establish packet switched data, voice, and/or video connections between communication devices 316 distributed throughout the communication system 300. The network proxy 322 can further comprise a memory 326 (such as a high capacity storage medium) embodied in this illustration as a database, and a controller 328 that makes use of computing technology such as a desktop computer, or scalable server for controlling operations of the network proxy 322. The network proxy 322 can operate as an IP Multimedia Subsystem (IMS) conforming in part to protocols defined by standards bodies such as 3GPP (Third Generation Partnership Protocol).

Under the control of the network proxy 322, the media gateway 309 can link packet-switched and circuit-switched technologies such as the cellular network 313 (or central office 306) and the network 305, such as an ISP network. The media gateway 309 can conform to a media gateway control protocol (MGCP) also known as H.248 defined by work groups in the Internet Engineering Task Force (IETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 300. The media gateway 309 can therefore support hybrid communication environments for communication devices 316, which do not need to be limited to set top boxes but rather can include VoIP terminals, hand held display devices and so forth.

The central office 306 can house common network switching equipment for distributing local and long-distance telecommunication services supplied by network 305 to buildings 312 (such as dwellings or commercial enterprises). Telecommunication services of the central office 306 can include traditional POTS (Plain Old Telephone Service) and broadband services such as HDTV, DSL, VoIP (Voice over Internet Protocol), IPTV (Internet Protocol Television), Internet services, and so on. The communication system 300 can utilize common computing and communications technologies to support circuit-switched and/or packet-switched communications, including MPLS.

Communication system 300 can comprise various data switches or other network devices that can manage network traffic to one or more users, such as communication devices 316. The data switches can be various network elements utilized for control of network traffic, including digital subscriber line access multipliers (DSLAMs), routers, and asynchronous transfer mode (ATM) switches.

The cellular network 313 can support voice and data services over a number of access technologies such as GSM-GPRS, EDGE, CDMA-1x, UMTS, WiMAX, software defined radio (SDR), and other known and future technologies. The cellular network 313 can be coupled to base stations 327 under a frequency-reuse plan for communicating over-the-air with roaming VoIP terminals 316.

Additionally, the network proxy 322 can be coupled to the Public Service Access Point (PSAP) 150 and/or the Emergency Alert Service (EAS) 160 by traditional means, such as the central office 306, media gateway 309 and/or network 305. The PSAP 150 and/or the EAS 160 can generate emergency broadcast and response services, such as an Emergency Alert Message (e.g., tornado or thunderstorm warning).

In one embodiment, to manage operations in relation to the PSAP 150 and/or EAS 160 including emergency services, the communication system 300 can comprise an emergency system (ES) 370 for managing distribution of emergency notices, and a presence system (PS) 380 for supplementing the services provided by the ES 370. The ES 370 can be utilized for directed distribution of emergency notices to parties designated by an end user of such service. Each of the ES 370 and the PS 380 can be incorporated with the network proxy 322, including sharing common components and/or can be independent systems that comprise a controller coupled to a memory operating as a database that stores relevant information, such as subscriber information. The controllers and memory can utilize common scalable computing and storage technologies.

In this exemplary embodiment, EAS messages can be displayed at the communication device 316 (such as an overlay of the alert message on the television screen) using a language selected by the user while also being communicated to other communication devices, such as based on a user configuration that designates other devices that should also receive the message. In one embodiment, presence information can be utilized to select one or more other devices from a group of other devices to forward the EAS message. The message being forwarded to the other communication devices can be of the same format as the EAS message received at the set top box or can be of a different format. In one embodiment, the format of the message that is sent to the other communication devices can be selected by the user, such as an audio message that is played over a mobile communication device that represents the EAS message received at the set top box.

Figure 4:
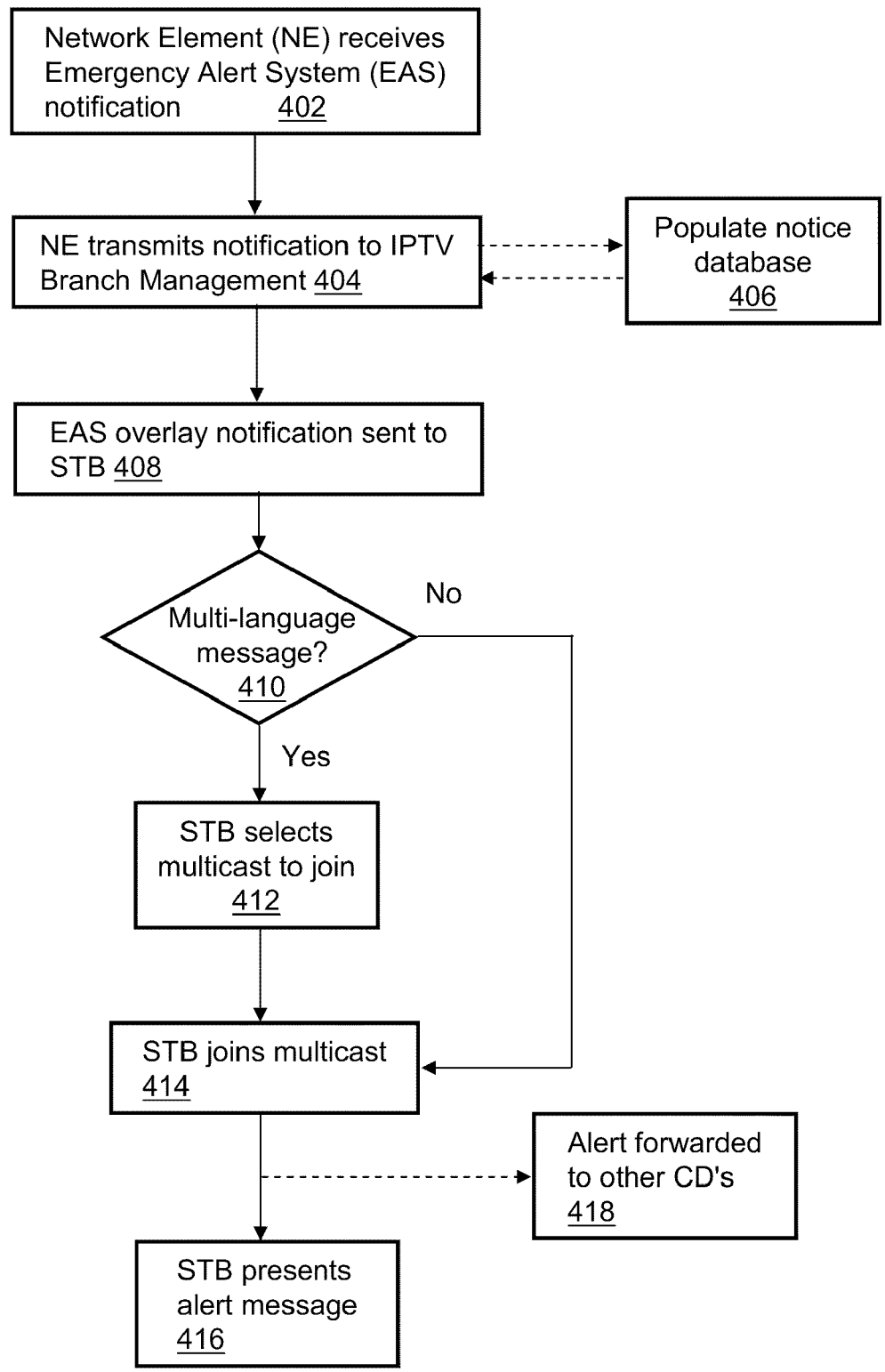
FIG. 4 depicts an exemplary method operating in one or more of the systems of FIGS. 1-3.

FIG. 4 depicts an exemplary method 400 operating in portions of the systems 100, 200 and/or 300. Method 400 has variants as depicted by the dashed lines. It would be apparent to an artisan with ordinary skill in the art that other embodiments not depicted in FIG. 4 are possible without departing from the scope of the claims described below. For example, method 400 is described with respect to an IPTV network, but the present disclosure also contemplates the steps being implement with other types of interactive television networks.

Method 400 begins with step 402 in which a network element receives and EAS notification. such as the ENDEC and/or EAC receiving the notification from a plurality of sources (e.g., NWS, LP1/LP2 and/or Internet). In step 404, the network element can transmit the notification to a Branch Management of the IPTV network. In one embodiment, a notification database can be maintained and populated by the VHO or other ISP proxy based upon receipt of EAS notifications as in step 406.

In step 408, an alert notification can be forwarded to the STB, such as by using a notification server that is in communication with the EAC and/or ENDEC. In step 410, the STB can determine whether the EAS message is in multi-language format. If the message is only is one language then the STB can join the multicast in step 414. The EAS message is then presented by the STB in step 416. If on the other hand, the EAS message is a multi-language message then method 400 proceeds to step 412 for selection of the appropriate language and thus selection of the corresponding multicast from a group of multicasts.

In one embodiment, the STB can retrieve language preferences that have been previously inputted into the STB or TV by the user, such as stored in a language configuration memory. Based upon the pre-selection of the language by the user, the STB can join the corresponding multicast in step 414. In another embodiment, the selection of the language for display of the EAS message can be based on user profiles associated with the STB. For instance, a user can enter a user profile upon turning on the TV (e.g., entering an alphanumeric code, bio-sensor data being provided and so forth) or an STB can otherwise determine the user profile based on a detection of the user who is viewing the TV. The user profile can include a language preference for the EAS messages. In another embodiment, the selection of the EAS message language can be based on historical data obtained with respect to one or more of the STB and the user profiles associated with the STB. For instance, the language of programs that are being watched at the STB can be monitored to determine the language that the EAS message is to be displayed. In this example, the STB can first determine whether a user has indicated a language preference and, if not, the historical data can then be utilized for making the language determination.

In another embodiment, the user can be presented with options at the time the language is being determined in order to override pre-selected languages or historical data determinations. For example, the STB can retrieve a pre-selection of English for the language and present a language notice that the EAS message will be retrieved in English unless the user advises otherwise (e.g., inputting a different language in response to the notice). In one embodiment, the language notice can be subject to a time period for overriding the determined language and absence of user input within that time period can result in the STB joining the multicast based on the determined language.

In one embodiment, the EAS message can be forwarded to one or more other communication devices associated with the STB and/or associated with users of the STB as in step 418. The EAS message can be transmitted in whole or in part. In another embodiment, information representative of the EAS message can be transmitted. For example, an audio EAS message can be transmitted as a text message to a cellular phone associated with the STB, which can be a verbatim message or can paraphrase the message. The present disclosure also contemplates supplemental information being provided with all or a portion of the EAS message. For example, if the EAS message is a tornado warning which provides the geographic location and time associated with the warning, the network proxy 322 can supplement the message with other information, including more detailed data and safety instructions.

In one embodiment, an alert notice can be provided to the subscriber's communication devices, such as a distinctive ring tone or a synthesized voice message. The alert notice can be different for different types of EAS messages. For example, a tornado warning can have a distinct tone that a subscriber can readily discern from a thunderstorm watch. In one embodiment, a subscriber can select the type of alert notice to be associated with one or more of the types of EAS messages.

In another embodiment, the network proxy 322 and/or the STB can retrieve or otherwise obtain presence information corresponding to the other communication devices associated with the STB. Presence information can be derived from the presence system 380 of FIG. 3, and/or from other sources, such as Global Positioning System (GPS) coordinate information received by the network proxy 322 directly from one or more of the subscriber's communication devices 316. The presence information can also include device activity information which can be used to hone in on which device is most likely used by a targeted user. The presence information can be derived by numerous techniques, and can vary depending upon the particular type of communication device. For example, the network proxy 322 can monitor various communication devices 316 associated with the STB, such as a cellular phone in transit which is being detected by a series of base stations or a computer that is exhibiting network activity. Such activities, as well as others, can be indicative of use by the subscriber or a likelihood of success in contacting the subscriber.

From the foregoing descriptions, it would be evident to an artisan with ordinary skill in the art that the aforementioned embodiments can be modified, reduced, or enhanced without departing from the scope and spirit of the claims described below. For example, the STB can determine from the EAS overlay notification whether the EAS message is subject to a plurality of multicasts in different languages. If multiple languages are available then the steps described in method 400 can be implemented. However, if the EAS message is in a single language then the STB can translate the EAS message upon receipt and present the translated EAS message to the user. The selection of the language for translation can be based on one or more of the techniques described with respect to method 400, including pre-selections of a language by the user.

In one embodiment, the EAS message received at the STB, or information representative thereof or supplemental thereto, can be communicated to various devices and combinations of devices, including a cell phone, a computer, an IPTV, a VoIP terminal, a POTS terminal, and a telematics system in an automobile. Forwarding of the EAS message to these other communication devices can be based upon presence information associated with the STB. If it is determined that a user did not likely view the EAS message presented by the STB then the message can be forwarded to the other devices. In another embodiment, a user and/or associates of the user can select different types of messages to be received by different associates, such as more serious emergency alert messages being transmitted to a first group of associates and less serious messages being transmitted to a second group of associates. The particular number and configuration of the groups of associates can be varied. These are but a few examples of the modifications that can be applied to the present disclosure without departing from the scope of the claims. Accordingly, the reader is directed to the claims for a fuller understanding of the breadth and scope of the present disclosure.

In another embodiment, the selection of the multicast to join can be based on the programming that is currently being presented to the user. For example, if the TV is tuned to a Spanish language channel then the set top box can join the multicast associated with the Spanish language version of the EAS message. In one embodiment, the EAS message can be presented in multiple languages. For example, the text can be overlayed in a first language and audio can be presented in a second language. The selection of the first and second languages can be based on a pre-selection by the user or according to the techniques described above. In another embodiment, the set top box can receive the multicast in the selected first language and then translate the EAS message into the second language so that the message is presented in the first and second languages, such as the visual and audio example described above. In yet another embodiment, method 400 can ensure compliance with notice requirements, such as federal, state or local requirements. For instance, if a region requires that the EAS message be presented in at least English then method 400 can present the EAS message in English as well as a desired language of the user of the STB.

Figure 5:
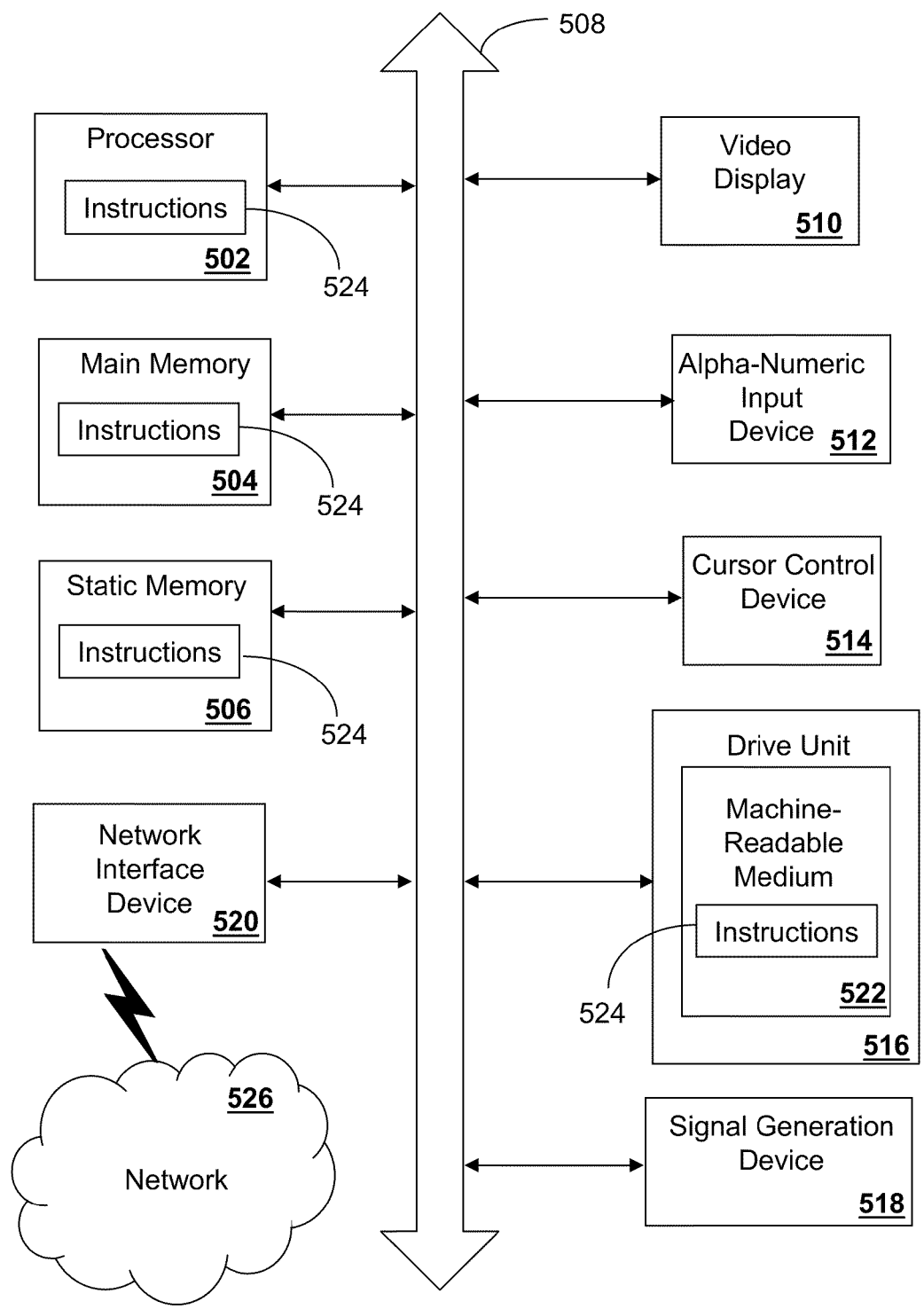
FIG. 5 depicts an exemplary diagrammatic representation of a machine in the form of a computer system within which a set of instructions, when executed, may cause the machine to perform any one or more of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a mass storage medium 516, a signal generation device 518 (e.g., a speaker or remote control) and a network interface device 520.

The mass storage medium 516 may include a computer-readable storage medium 522 on which is stored one or more sets of instructions (e.g., software 524) embodying any one or more of the methodologies or functions described herein, including those methods illustrated above. The computer-readable storage medium 522 can be an electromechanical medium such as a common disk drive, or a mass storage medium with no moving parts such as Flash or like non-volatile memories. The instructions 524 may also reside, completely or at least partially, within the main memory 504, the static memory 506, and/or within the processor 502 during execution thereof by the computer system 500. The main memory 504 and the processor 502 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the computer-readable storage medium 522 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium operating in an Internet Protocol Television (IPTV) network, the medium comprising computer instructions for:
receiving an emergency alert notification from an emergency alert system by way of an OSS/BSS gateway, the emergency alert notification being associated with an emergency alert message of the emergency alert system;
transmitting an overlay notification signal to a set top box coupled to the IPTV network;
receiving a request from the set top box in response to the overlay notification signal to join a first multicast of the emergency alert message selected from a group of multicasts of the emergency alert message, wherein each of the group of multicasts is in a different language, wherein the first multicast is selected based on a pre-selection of a language associated with the set top box; and
multicasting the emergency alert message in the different languages, wherein the set top box is adapted to receive the first multicast of the emergency alert message in the pre-selected language.

2. The storage medium of claim 1, wherein the pre-selection of the language is stored in a memory of the set top box.

3. The storage medium of claim 1, comprising computer instructions for populating a database with notification information associated with receipt of the first multicast by the set top box.

4. The storage medium of claim 1, wherein a secondary alert message is transmitted to one or more communication devices associated with the set top box, and wherein the secondary alert message is representative of the emergency alert message.

5. The storage medium of claim 4, wherein the communication devices are selected based on presence information associated with a user of the set top box.

6. A set top box in communication with an interactive television network, the set top box comprising a controller to:
receive a notification signal from a network server of the interactive television network, the notification signal being associated with an emergency alert message received by the network server from an emergency alert system;
determine a language for presenting the emergency alert message;
select a first multicast of the emergency alert message from a group of multicasts based on the determined language, each of the group of multicasts of the emergency alert message being in a different language;
transmit a request to the network server to join the first multicast of the emergency alert message; and
receive the first multicast of the emergency alert message.

7. The set top box of claim 6, wherein the controller is adapted to present the emergency alert message in the determined language.

8. The set top box of claim 6, wherein the controller is adapted to determine the language based on a pre-selection of the language stored in a memory accessible by the set top box.

9. The set top box of claim 6, wherein the controller is adapted to determine the language based on historical information associated with the set top box.

10. The set top box of claim 6, wherein the interactive television network comprises an Internet Protocol Television (IPTV) network, and wherein the emergency alert message is transmitted using an OSS/BSS gateway of the IPTV network.

11. The set top box of claim 6, wherein the controller is adapted to transmit a secondary alert message representative of the emergency alert message to one or more communication devices associated with the set top box.

12. The set top box of claim 11, wherein the controller is adapted to select the communication devices from a group of communication devices associated with the set top box based on presence information associated with a user of the set top box.

13. The set top box of claim 11, wherein the controller is adapted to modify a format of the emergency alert message to generate the secondary alert message.

14. The set top box of claim 6, wherein the controller is adapted to translate the emergency alert message into another language.

15. A method of communicating an emergency alert message of a public emergency alert system, the method comprising:
receiving a notification signal from a network server of an interactive television network, the notification signal being associated with the emergency alert message received by the network server from the public emergency alert system;
determining a language for presenting the emergency alert message; and
presenting the emergency alert message in the determined language, wherein the presented emergency alert message is obtained by a set top box based on selecting the first multicast of the emergency alert message from a group of multicasts based on the determined language, wherein each of the group of multicasts of the emergency alert message are in a different language.

16. The method of claim 15, comprising selecting the first multicast based on a pre-selection of the language, wherein the pre-selection is stored in a memory accessible by the set top box.

17. The method of claim 15, comprising selecting the first multicast based on historical viewing information associated with the set top box.

18. The method of claim 15, comprising selecting the first multicast based on a user profile associated with the set top box.

19. The method of claim 15, comprising transmitting a secondary alert message representative of the emergency alert message to one or more communication devices associated with the set top box.

* * * * *